United States Patent
Sandhu

(10) Patent No.: US 8,040,968 B2
(45) Date of Patent: Oct. 18, 2011

(54) HIGH RATE, HIGH DIVERSITY TRANSMISSION ON MULTIPLE TRANSMIT ANTENNAS

(75) Inventor: Sumeet Sandhu, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 1722 days.

(21) Appl. No.: 10/954,952

(22) Filed: Sep. 30, 2004

(65) Prior Publication Data

US 2006/0067419 A1    Mar. 30, 2006

(51) Int. Cl.
*H04L 1/02* (2006.01)
*H04B 7/02* (2006.01)
(52) U.S. Cl. .................. 375/267; 375/269; 375/347
(58) Field of Classification Search .............. 375/267, 375/269, 270, 279, 347, 348, 261, 299
See application file for complete search history.

(56) References Cited

U.S. PATENT DOCUMENTS

| | | | |
|---|---|---|---|
| 2005/0002468 A1* | 1/2005 | Walton et al. | 375/267 |
| 2005/0047518 A1* | 3/2005 | Auer | 375/267 |
| 2005/0281322 A1* | 12/2005 | Lee et al. | 375/146 |
| 2007/0019754 A1* | 1/2007 | Raleigh et al. | 375/260 |

FOREIGN PATENT DOCUMENTS

| | | |
|---|---|---|
| EP | 1195937 A1 | 4/2002 |
| EP | 1367760 * | 12/2003 |
| EP | 1367760 A2 | 12/2003 |
| JP | 2002-152091 | 5/2002 |
| TW | 200301644 | 7/2003 |

OTHER PUBLICATIONS

Lindskog, Erik et al; "Enhancements of Space-Time Codes for the OFDMA PHY"; IEEE C802.16e-04/204r1; Jul. 7, 2004.*
Tong et al.; "MIMO differential modulations"; IEEE C802.16e-04/559; Nov. 10, 2004.*
Khan, Zafar A., et al., "Rectangular Co-ordinate Interleaved Orthogonal Design", *GLOBECOM 2003*, 7(7), (Dec. 1, 2003), 2004-2009.

* cited by examiner

*Primary Examiner* — Chieh M Fan
*Assistant Examiner* — Qutbuddin Ghulamali
(74) *Attorney, Agent, or Firm* — Thorpe North & Western LLP

(57) ABSTRACT

High data rate, high diversity transmission is provided in a dual transmit antenna system over multiple sample times through the use of coding.

37 Claims, 4 Drawing Sheets

HIGH RATE, HIGH DIVERSITY TRANSMISSION ON MULTIPLE TRANSMIT ANTENNAS

TECHNICAL FIELD

The invention relates generally to wireless communications and, more particularly, to techniques and structures for enhancing performance in a wireless communication system.

BACKGROUND OF THE INVENTION

Multiple input multiple output (MIMO) is a radio communication technique in which both a transmitter and a receiver use multiple antennas to wirelessly communicate with one another. By using multiple antennas at the transmitter and receiver, a level of spatial diversity is achieved that may enable a wireless link to overcome certain deleterious channel effects, such as multipath fading. However, the use of multiple antennas alone may result in a sub-optimal level of diversity. There is a need for techniques and structures that are capable of enhancing the level of diversity achievable in a multiple antenna system.

DETAILED DESCRIPTION

Figure 1:
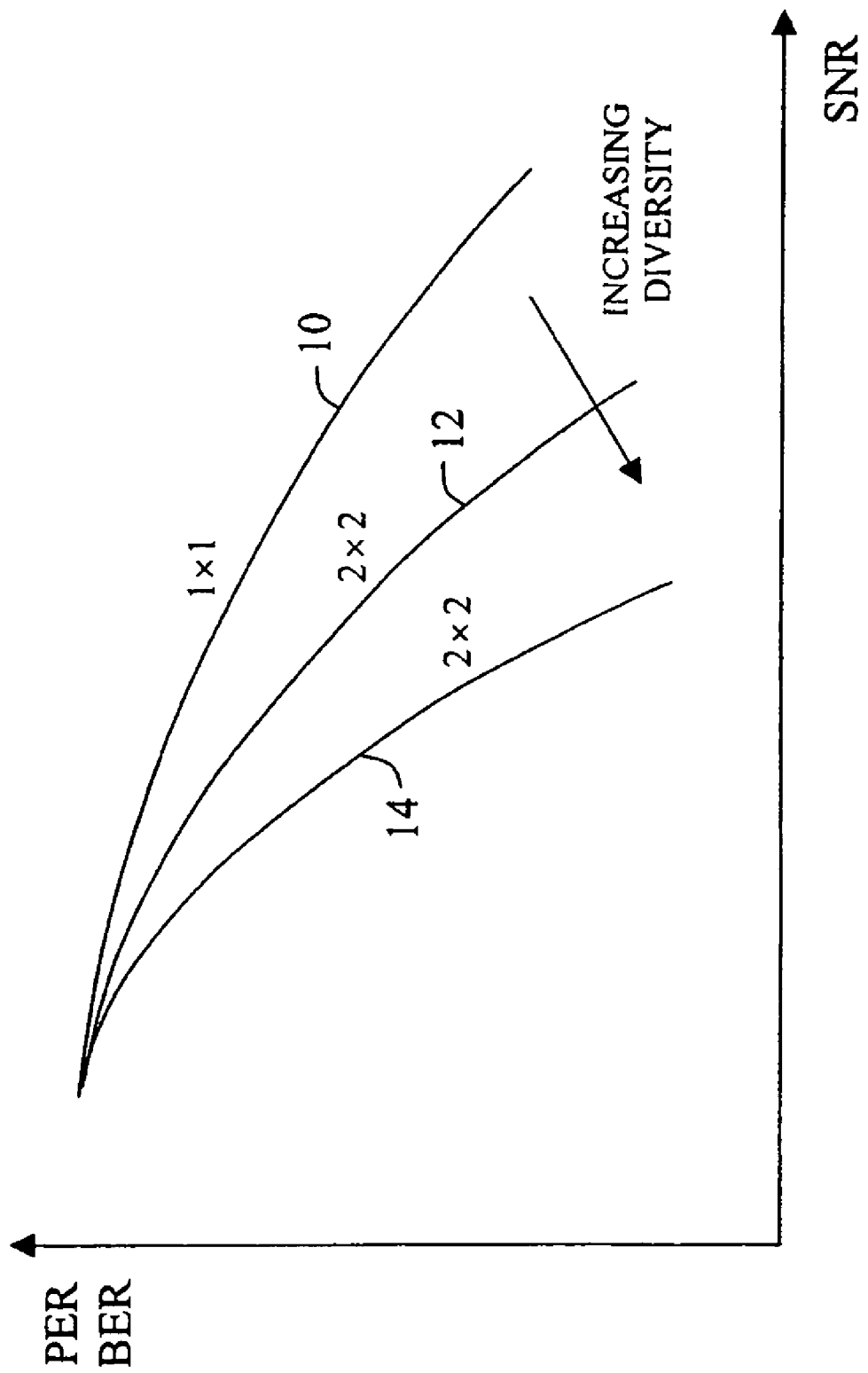
FIG. 1 is a graph illustrating the relationship between packet error rate (PER)/bit error rate (BER) and signal to noise ratio (SNR) in a few different wireless channel scenarios.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a graph illustrating the relationship between packet error rate (PER)/bit error rate (BER) and signal to noise ratio (SNR) in a few different wireless channel scenarios. As is well known, the relationship between PER/BER and SNR for a channel will depend upon the level of diversity in the channel. A channel formed by a single transmit antenna and a single receive antenna (i.e., a 1×1 channel) has diversity order equal to one and, therefore, a relatively high SNR is required to achieve a given error rate (see plot 10 in FIG. 1). Diversity order is equal to the slope of the PER versus SNR curve. With an $M_t \times M_r$ MIMO system, the maximum possible diversity order is equal to $M_t M_r$ (with independent spatial fading and no frequency diversity): Therefore, for 2×2 MIMO, order 4 diversity can be achieved. With poor code design, diversity order smaller than 4 is achieved as shown in plot 12 of FIG. 1. With proper design, a slope of 4 can be achieved as shown in plot 14. In at least one aspect of the present invention, techniques and structures for coding transmit signals in a two transmit antenna system are provided that are capable of enhancing a level of diversity achieved in the corresponding channel.

Figure 2:
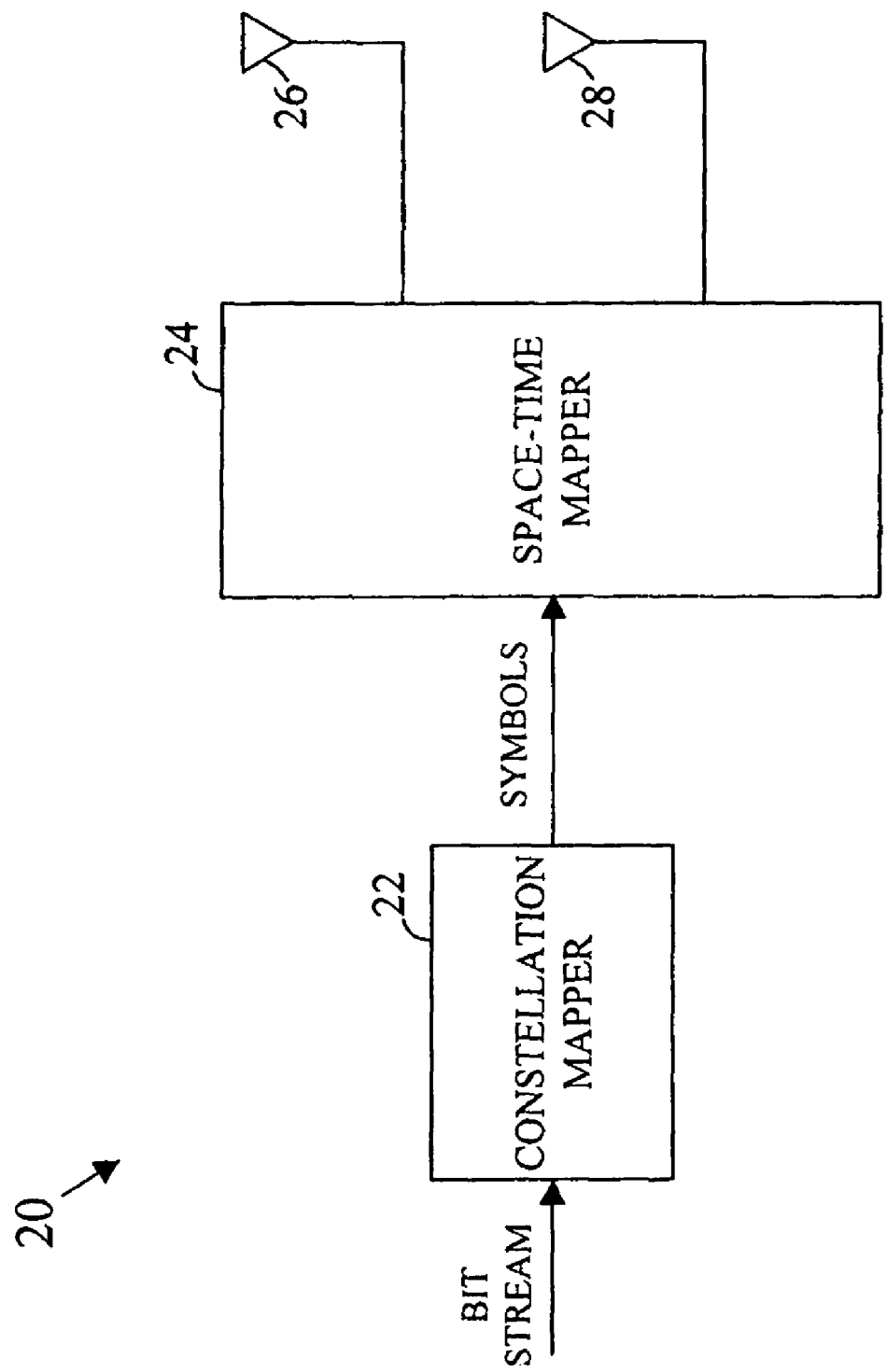
FIG. 2 is a block diagram illustrating an example transmitter arrangement in accordance with an embodiment of the present invention.

FIG. 2 is a block diagram illustrating an example transmitter arrangement 20 in accordance with an embodiment of the present invention. As shown, the transmitter arrangement 20 includes: a constellation mapper 22, a space-time mapper 24, and first and second transmit antennas 26, 28. The constellation mapper 22 receives an input bit stream and converts the bit stream to corresponding modulation symbols based on a predetermined modulation constellation (e.g., binary phase shift keying (BPSK), quadrature phase shift keying (QPSK), 4 quadrature amplitude modulation (4-QAM), 16-QAM, 64-QAM, etc.). The space-time mapper 24 receives the modulation symbols output by the constellation mapper 22 and generates signals to be transmitted from the first and second transmit antennas 26, 28. The first and second transmit antennas 26, 28 may include any type of antennas including, for example, dipoles, patches, helical antennas, antenna arrays, and/or others. As will be discussed in greater detail, the space-time mapper 24 processes the symbols in a manner that enhances the diversity of the corresponding channel.

In at least one embodiment of the present invention, a code is provided that is capable of achieving full diversity in a dual antenna system by transmitting four complex symbols on two transmit antennas over two time samples. The codeword for the code may be represented by the following 2×2 matrix:

$$X = \begin{bmatrix} x_1 + \theta x_3 & -x_2^* - \theta x_4^* \\ x_2 + \theta x_4 & x_1^* + \theta x_3^* \end{bmatrix}$$

where $x_1$, $x_2$, $x_3$, and $x_4$ are complex symbols, x* denotes the complex conjugate of x, and $\theta$ is a parameter that depends on the constellation from which the symbols were drawn (e.g., when BPSK is being used, $\theta = j$ may be used, and so on). The first and second rows of the matrix X correspond to the first and second antennas of the associated transmitter, respectively (e.g., antennas 26 and 28 in FIG. 2). The first and second columns of the matrix X correspond to first and second consecutive time samples (e.g., $t_i$ and $t_{i+1}$). With reference to FIG. 2, the symbols $x_1$, $x_2$, $x_3$, and $x_4$ may be four consecutive symbols output by the constellation mapper 22. The space-time mapper 24 inputs the four symbols and uses them to generate signals to be transmitted from the first and second antennas 26, 28 over two sample times. At a first sample time, the space-time mapper 24 may deliver $x_1 + \theta x_3$ to the first antenna 26 and $x_2 + \theta x_4$ to the second antenna 28 for transmission. At the next sample time, the space-time mapper 24 may deliver $-x_2^* - \theta x_4^*$ to the first antenna 26 and $x_1^* + \theta x_3^*$ to the second antenna 28 for transmission. It should be appreciated that other elements may be present between the space-time mapper 24 and each of the two antennas 26, 28 in various embodiments. For example, elements such as frequency up converters, power amplifiers, I-Q modulators, and/or others may be used.

In the field of space-time coding, it has been observed that, at higher data rates, the Alamouti code does not perform as well as spatial multiplexing. The Alamouti code is represented by the following codeword matrix:

$$\begin{bmatrix} x_1 & -x_2^* \\ x_2 & x_1^* \end{bmatrix}$$

and spatial multiplexing (SM) may be represented as follows:

$$\begin{bmatrix} x_1 & x_3 \\ x_2 & x_4 \end{bmatrix}$$

At higher rates, it is better to use SM with smaller QAM constellations (that $x_1, \ldots, x_4$ belong to) than the Alamouti code with larger QAM constellations (that $x_1, x_2$ belong to), at the same total data rate. However, it is well known that SM only provides diversity of order $M_r$, not $M_r M_t$. The codes of the present invention can be shown to provide full diversity (i.e., rank of this matrix=2) for certain values of θ. One of the conditions on θ is that:

$$\theta \neq \frac{xdi}{xdj} \text{ for any } xdi \text{ and } xdj$$

where xdi and xdj are pairwise differences between 2 QAM symbols. The above condition is sufficient to achieve full diversity for QAM sizes up to 16. The following values of θ have been determined experimentally to provide full diversity for the subject code:

| QAM | θ |
| --- | --- |
| 2 | $e^{j\frac{\pi}{4}}$ |
| 4 | $e^{j\frac{\pi}{8}}$ |
| 16 | $e^{j\frac{\pi}{8}}$ |

As the reader will appreciate, the codeword X set out above may be modified in various ways without losing its diversity enhancing characteristics. For example, row and/or column permutations may be made. Similarly, symbols may be conjugated and/or negated, as long as such actions are taken with respect to the entire matrix.

In the description above, the codeword X is described as being implemented in a single carrier system. The above-described code may also be used within multicarrier communication systems. In a multicarrier system, the symbol transformations associated with the codeword may be made for the individual subcarriers of the multicarrier signals to be transmitted. When used in a multicarrier system, the space-time mapper 24 of FIG. 1 may be replaced by a space-time-frequency mapper to account for the mapping of data to the individual subcarriers. In at least one embodiment of the present invention, the code is used within an orthogonal frequency division multiplexing (OFDM) type of multicarrier system.

Figure 3:
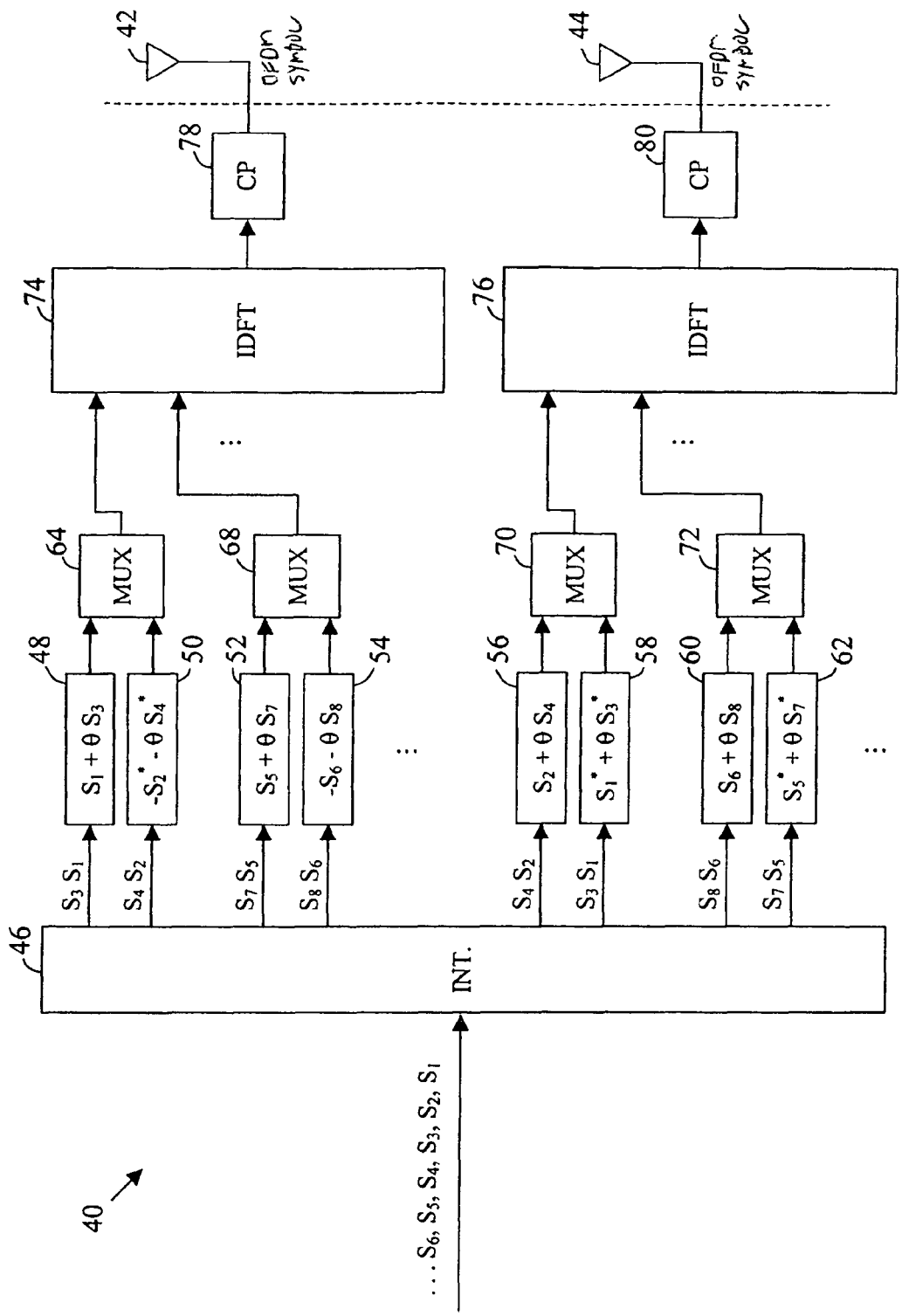
FIG. 3 is a block diagram illustrating an example space-time-frequency mapper arrangement that may be used within an OFDM system in accordance with an embodiment of the present invention.

FIG. 3 is a block diagram illustrating an example space-time-frequency mapper arrangement 40 that may be used within an OFDM system in accordance with an embodiment of the present invention. As shown, the space-time-frequency mapper arrangement 40 may receive a stream of modulation symbols $S_1, S_2, S_3, \ldots$ at an input thereof and use the symbols to generate OFDM symbols for delivery to first and second antennas 42, 44. The space-time-frequency mapper arrangement 40 may include one or more of: a symbol interleaver 46; a number of transform units 48, 50, 52, 54, 56, 58, 60, 62; a number of multiplexers (MUXs) 64, 68, 70, 72; a pair of inverse discrete Fourier transform (IDFT) units 74, 76; and a pair of cyclic prefix units 78, 80. Each of the IDFT units 74, 76 has a number of inputs, each of which corresponds to a subcarrier of the system. For each subcarrier, functionality is provided for determining the corresponding elements of the matrix X to be transmitted at each particular sample time. Each subcarrier may generate the codeword X using four different symbols from the input stream (e.g., $S_1, S_2, S_3, S_4$ for a first subcarrier, $S_5, S_6, S_7, S_8$ for a second subcarrier, and so on).

The transform units 48, 50, 52, 54, 56, 58, 60, 62 are operative for performing the various symbol transformations that are included within the codeword X. Thus, for a first subcarrier associated with the first antenna 42, transform unit 48 performs the transformation $S_1+\theta S_3$ and transform unit 50 performs the transformation $-S_2^*-\theta S_4^*$. Similarly, for a first subcarrier associated with the second antenna 44, transform unit 56 performs the transformation $S_2+\theta S_4$ and transform unit 58 performs the transformation $S_1^*+\theta S_3^*$. Similar transform units may be provided for the other subcarriers. The symbol interleaver 46 receives the input symbol stream and interleaves the symbols therein among the corresponding transform units 48, 50, 52, 54, 56, 58, 60, 62. For example, in the illustrated embodiment, symbol interleaver 46 may deliver symbols $S_1$ and $S_3$ to transform unit 48, symbols $S_2$ and $S_4$ to transform unit 50, and so on.

As described previously, the first and second columns of the codeword X above correspond to first and second consecutive sample times (e.g., $t_i$ and $t_{i+1}$). The MUXs 64, 68, 70, 72 are operative for implementing this time relationship. As shown, each MUX 64, 68, 70, 72 has an output coupled to an input of a corresponding IDFT. Each MUX 64, 68, 70, 72 also receives an input from two corresponding transform units. At a first sample time, each MUX will couple an output signal of one of the corresponding transform units to the associated input of the IDFT. At the next sample time, the MUX will couple the other transform unit to the input of the IDFT. A similar approach is used for each of the subcarriers and each of the antennas 42, 44.

At a first sample time, each of the IDFT units 74, 76 will receive an input for each of the subcarriers. The IDFT units 74, 76 then convert this frequency domain information to a time domain representation. The time domain representation may then be converted to a serial form and output to a corresponding cyclic prefix unit 78, 80 which will add a cyclic prefix to the corresponding signal to form an OFDM symbol. The OFDM symbol output by each cyclic prefix unit 78, 80 may then be delivered to a corresponding transmit antenna 42, 44.

In some other embodiments of the present invention, a code is provided that is capable of achieving full diversity or near full diversity in a dual antenna system by transmitting four complex symbols on two transmit antennas over three time samples. The codeword for this code may be represented by the following 2×3 matrix:

$$X = \begin{bmatrix} x_1 & -x_2^* + \theta x_3 & -x_4^* \\ x_2 & x_1^* + \theta x_4 & x_3^* \end{bmatrix}$$

where $x_1$, $x_2$, $x_3$, and $x_4$ are complex symbols, x* denotes the complex conjugate of x, and θ is a parameter that depends on the constellation from which the symbols were drawn. If BPSK is being used, the value of θ may be j. For QPSK, the value of θ may be $e^{j\pi/4}$, and so on. Although not shown, the elements in the second column of matrix X should be normalized by $\sqrt{2}$. As in the previously discussed code, the first and second rows of the 2×3 matrix X correspond to the first and second antennas of an associated transmitter, respectively (e.g., antennas 26 and 28 in FIG. 2). The first, second, and third columns of the 2×3 matrix correspond to first, second, and third consecutive sample times (e.g., $t_i$, $t_{i+1}$, $t_{i+2}$). Referring back to FIG. 2, the symbols $x_1$, $x_2$, $x_3$, and $x_4$ in the 2×3 matrix may be four consecutive symbols output by the constellation mapper 22. The space-time mapper 24 receives the four symbols and uses them to generate signals to be transmitted from the first and second antennas 26, 28 over three sample times. At a first sample time, the space-time mapper 24 may deliver $x_1$ to the first antenna 26 and $x_2$ to the second antenna 28 for transmission. At a next sample time, the space-time mapper 24 may deliver $-x_2^*+\theta x_3$ to the first antenna 26 and $x_1^*+\theta x_4$ to the second antenna 28 for transmission. At a third sample time, the space-time mapper 24 may deliver $-x_4^*$ to the first antenna 26 and $x_3^*$ to the second antenna 28 for transmission. The codeword represented by the 2×3 matrix may be modified in various ways without losing its diversity enhancing characteristics. For example, row and/or column permutations may be made. Similarly, symbols may be conjugated and/or negated, as long as such actions are taken with respect to the entire matrix.

Figure 4:
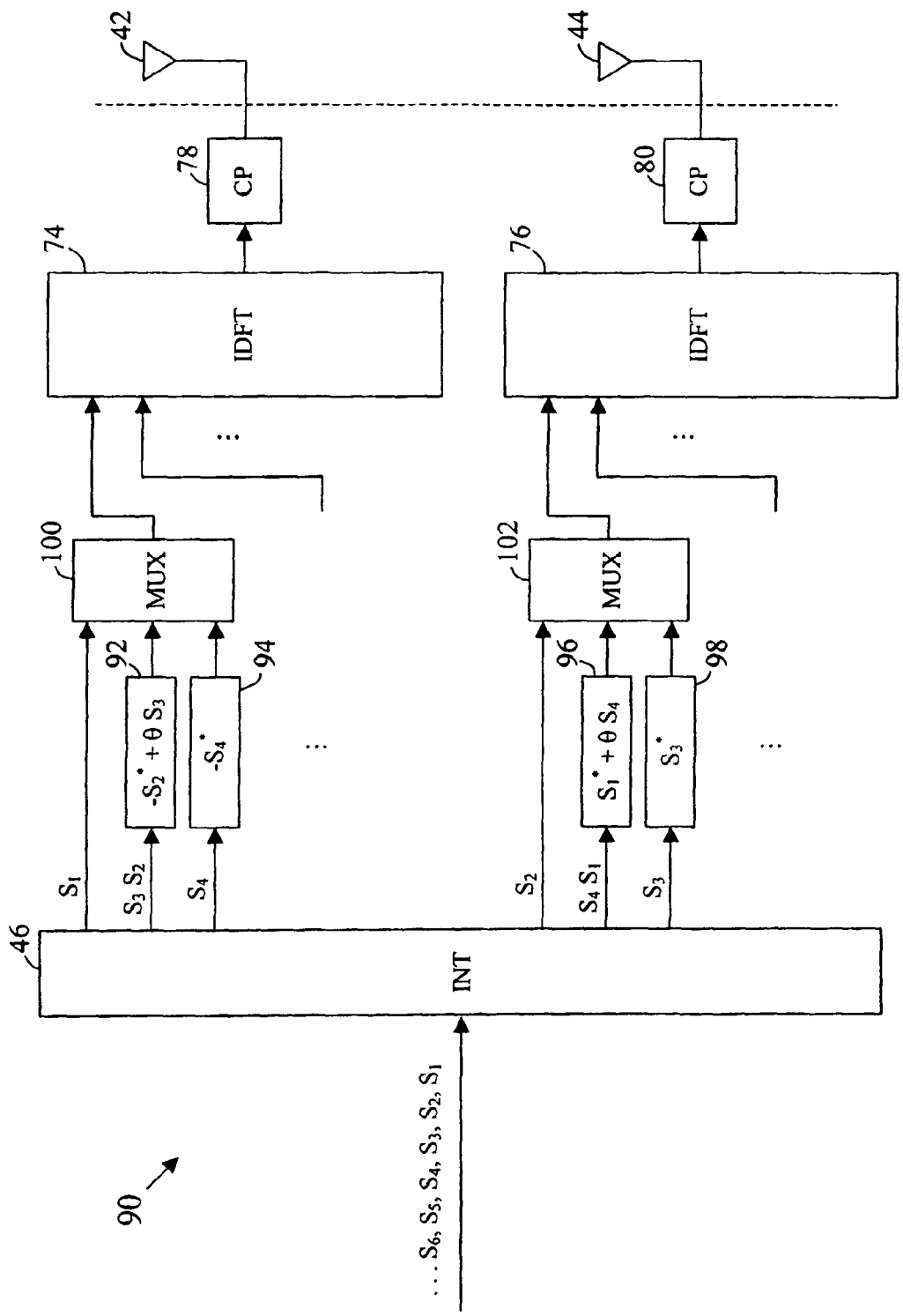
FIG. 4 is a block diagram illustrating another example space-time-frequency mapper arrangement that may be used within an OFDM system in accordance with an embodiment of the present invention.

FIG. 4 is a block diagram illustrating an example space-time-frequency mapper arrangement 90 that may be used within an OFDM system in accordance with an embodiment of the present invention. The space-time-frequency mapper arrangement 90 is configured to operate with the code word represented by the 2×3 matrix set out above. As in the previous embodiment, the space-time-frequency mapper arrangement 90 may include a symbol interleaver 46; a number of transform units 92, 94, 96, 98; a number of MUXs 100, 102; a pair of inverse discrete Fourier transform (IDFT) units 74, 76; and a pair of cyclic prefix units 78, 80. Unlike the previous embodiment, the MUXs 100, 102 are now set up to operate over three consecutive sample times. That is, at a first sample time, a first input of a MUX will be coupled to an input of a corresponding IDFT; at a second sample time, a second input of the MUX will be coupled to the input of the corresponding IDFT; and at a third sample time, a third input of the MUX will be coupled to the input of the IDFT.

With reference to FIG. 4, the first MUX 100 corresponds to a first subcarrier associated with the first transmit antenna 42. Because no transformation is needed for the symbol $S_1$, no corresponding transform unit is needed between the interleaver 46 and the first input of the MUX 100. Transform unit 92 performs the transformation $-S_2^*+\theta S_3$ and transform unit 94 performs the transformation $-S_4^*$. Similarly, the second MUX 102 corresponds to a first subcarrier associated with the second transmit antenna 44. Because no transformation is needed for the symbol $S_2$, no corresponding transform unit is needed between the interleaver 46 and the first input of the MUX 102. Transform unit 96 performs the transformation $S_1^*+\theta S_4$ and transform unit 98 performs the transformation $S_3^*$. As the reader will appreciate, similar functionality will be provided for the other subcarriers. As before, the OFDM symbols output by the cyclic prefix units 78, 80 are delivered to the corresponding antennas 42, 44 for transmission.

The following is a proof that the code represented by the 2×3 matrix X set out above is capable of achieving full or near full diversity with two transmit antennas. The following proof assumes that all symbols $x_i$ are uncoded (and therefore uncorrelated) and drawn from a complex constellation χ of size |χ|=Q. The pair-wise difference matrix $\tilde{X}$ is shown below. The corresponding element-wise difference constellation may be represented as $\tilde{\chi}$.

$$\tilde{X} = \begin{bmatrix} \tilde{x}_1 & -\tilde{x}_2^* + \theta\tilde{x}_3 & -\tilde{x}_4^* \\ \tilde{x}_2 & \tilde{x}_1^* + \theta\tilde{x}_4 & \tilde{x}_3^* \end{bmatrix}$$

It can be shown that all the pair-wise difference matrices $\tilde{X}$ must be rank d in order for the codebook to provide diversity order d. For 2 transmit antennas, it is required that $\tilde{X}$ be rank 2 for all possible $\tilde{x}_i$ in order to achieve diversity order 2. With $M_R$ receive antennas, the total diversity expected is $2M_R$. It is assumed that pair-wise symbol differences $\tilde{x}_1, \tilde{x}_2, \tilde{x}_3, \tilde{x}_4$ are all zero unless otherwise specified. Full diversity will be proven herein by systematically tabulating all cases of nonzero $\tilde{x}_i$.

1) $\tilde{x}_1 \neq 0$

The difference matrix in this case is full rank as shown below. By symmetry, this proof applies to any of the $\tilde{x}_i$ being nonzero.

$$\tilde{X} = \begin{bmatrix} \tilde{x}_1 & 0 & 0 \\ 0 & \tilde{x}_1^* & 0 \end{bmatrix}'$$

2) $\tilde{x}_1 \neq 0 \neq \tilde{x}_2$

The difference matrix is again full rank as shown below. This proof follows from the proof for full diversity of the Alamouti code.

$$\tilde{X} = \begin{bmatrix} \tilde{x}_1 & -\tilde{x}_2^* & 0 \\ \tilde{x}_2 & \tilde{x}_1^* & 0 \end{bmatrix}$$

3) $\tilde{x}_1 \neq 0 \neq \tilde{x}_3$

The difference matrix for this case is:

$$\tilde{X} = \begin{bmatrix} \tilde{x}_1 & \theta\tilde{x}_3 & 0 \\ 0 & \tilde{x}_1^* & \tilde{x}_3^* \end{bmatrix}$$

4) $\tilde{x}_1 \neq 0$, $\tilde{x}_2 \neq 0$, and $\tilde{x}_3 \neq 0$

The difference matrix for this case is:

$$\tilde{X} = \begin{bmatrix} \tilde{x}_1 & -\tilde{x}_2^* + \theta\tilde{x}_3 & 0 \\ \tilde{x}_2 & \tilde{x}_1^* & \tilde{x}_3^* \end{bmatrix}$$

5) $\tilde{x}_1 \neq 0 \neq \tilde{x}_4$

This is the most interesting case in that it places constraints on the value of θ.

$$\tilde{X} = \begin{bmatrix} \tilde{x}_1 & 0 & -\tilde{x}_4^* \\ 0 & \tilde{x}_1^* + \theta \tilde{x}_4 & 0 \end{bmatrix} \qquad 5)$$

The matrix above is full rank if $\tilde{x}_1^* + \theta \times \tilde{x}_4 \neq 0$ for all $\tilde{x}_1$ and $\tilde{x}_4$. That is, θ must be solved for such that $\theta \neq -\tilde{x}_1^*/\tilde{x}_4$ for all $\tilde{x}_1$ and $\tilde{x}_4$. Since the values of $\tilde{x}_i$ depend on the constellation $\chi$, the value of θ depends on the constellation. For example, for BPSK, θ=j is one solution. Many other solutions also exist. Intuitively, θ may be chosen to extend the set of pair-wise differences $\tilde{\chi}$ to a larger set, in order to prevent cancellations of $\tilde{x}_i + \theta \tilde{x}_j$ within $\tilde{\chi}$.

$$\tilde{x}_1, \tilde{x}_2, \tilde{x}_3, \tilde{x}_4 \neq 0 \qquad 6)$$

This case can be deduced from cases 1) to 5) above.

The techniques and structures of the present invention may be implemented in any of a variety of different forms. In at least one application, features of the invention are implemented within a high throughput wireless network. In various embodiments, features of the invention may be embodied within, for example, laptop, palmtop, desktop, and tablet computers having wireless capability; personal digital assistants having wireless capability; wireless network interface cards (NICs) and other network interface structures; wireless access points; cellular telephones and other handheld wireless communicators; cellular base stations; pagers; satellite communicators; cameras and other imaging devices having wireless capability; audio/video devices having wireless capability; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

It should be appreciated that the individual blocks illustrated in the block diagrams herein may be functional in nature and do not necessarily correspond to discrete hardware elements. For example, in at least one embodiment, two or more of the blocks in a block diagram are implemented within a common digital processing device. The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for transmitting data symbols from two antennas, comprising:
    mapping an input bit stream into complex symbols $x_1$, $x_2$, $x_3$, and $x_4$ based on a predetermined modulation constellation, said complex symbols $x_1$, $x_2$, $x_3$, and $x_4$ for transmission to a remote receiver;
    first transmitting $x_1 + \theta x_3$ from a first antenna and $x_2 + \theta x_4$ from a second antenna at a first sample time; and
    second transmitting $-x_2^* - \theta x_4^*$ from said first antenna and $x_1^* + \theta x_3^*$ from said second antenna at a second sample time, wherein no transmissions other than first transmitting and second transmitting are made to transmit said complex input symbols $x_1$, $x_2$, $x_3$, and $x_4$ to said remote receiver;
    wherein x* is the complex conjugate of x and θ is a parameter that depends on said predetermined modulation constellation.

2. The method of claim 1, wherein:
    said second sample time occurs after said first sample time.

3. The method of claim 1, wherein:
    said second sample time occurs before said first sample time.

4. The method of claim 1, wherein:
    said method achieves full diversity in a corresponding wireless channel.

5. The method of claim 1, wherein:
    said modulation constellation is a binary phase shift keying (BPSK) constellation and θ=j.

6. The method of claim 1, wherein:
    said method is for use in a multicarrier system having a plurality of subcarriers; and
    first and second transmitting includes transmitting within a predetermined subcarrier of a multicarrier signal.

7. The method of claim 6, wherein:
    said multicarrier system is an orthogonal frequency division multiplexing (OFDM) system.

8. A method for transmitting data symbols from two antennas, comprising:
    mapping an input bit stream into complex symbols $x_1$, $x_2$, $x_3$, and $x_4$ based on a predetermined modulation constellation, said complex symbols $x_1$, $x_2$, $x_3$, and $x_4$ for transmission to a remote receiver;
    first transmitting $x_1$ from a first antenna and $x_2$ from a second antenna at a first sample time;
    second transmitting $-x_2^* + \theta x_3$ from said first antenna and $x_1^* + \theta x_4$ from said second antenna at a second sample time; and
    third transmitting $-x_4^*$ from said first antenna and $x_3^*$ from said second antenna at a third sample time;
    wherein x* is the complex conjugate of x and θ is a parameter that depends on said predetermined modulation constellation.

9. The method of claim 8, wherein:
    said second sample time occurs after said first sample time and said third sample time occurs after said second sample time.

10. The method of claim 8, wherein:
    said method achieves full diversity in a corresponding wireless channel.

11. The method of claim 8, wherein:
said modulation constellation is a binary phase shift keying (BPSK) constellation and $\theta=j$.
12. The method of claim 8, wherein:
said modulation constellation is a quadrature phase shift keying (QPSK) constellation and $\theta=e^{j\pi/4}$.
13. The method of claim 8, wherein:
said method is for use in a multicarrier system having a plurality of subcarriers; and
first and second transmitting includes transmitting within a predetermined subcarrier of a multicarrier signal.
14. The method of claim 13, wherein:
said multicarrier system is an orthogonal frequency division multiplexing (OFDM) system.
15. A communication device comprising:
a constellation mapper to map an input bit stream into complex symbols $x_1$, $x_2$, $x_3$, and $x_4$ based on a predetermined modulation constellation; and
a space-time-frequency mapper to encode and map said complex symbols for transmission from first and second antennas, wherein said space-time-frequency mapper maps: (a) $x_1+\theta x_3$ for transmission from said first antenna and $x_2+\theta x_4$ for transmission from said second antenna at a first sample time using a predetermined subcarrier of a multicarrier signal and (b) $-x_2^*-\theta x_4^*$ for transmission from said first antenna and $x_1^*+\theta x_3^*$ for transmission from said second antenna at a second sample time using said predetermined subcarrier, where $x^*$ is the complex conjugate of x and $\theta$ is a parameter that depends on said predetermined modulation constellation.
16. The communication device of claim 15, wherein:
said predetermined modulation constellation is a binary phase shift keying (BPSK) constellation and $\theta=j$.
17. The communication device of claim 15, wherein:
said second sample time occurs before said first sample time.
18. The communication device of claim 15, wherein:
said multicarrier signal includes an orthogonal frequency division multiplexing (OFDM) symbol.
19. The communication device of claim 15, wherein:
said communication device is configured to achieve full diversity.
20. A communication device comprising:
a constellation mapper to map an input bit stream into complex symbols $x_1$, $x_2$, $x_3$, and $x_4$ based on a predetermined modulation constellation; and
a space-time-frequency mapper to map said complex symbols for transmission from first and second antennas, wherein said space-time-frequency mapper maps (a) $x_1$ for transmission from said first antenna and $x_2$ for transmission from said second antenna at a first sample time using a predetermined subcarrier of a multicarrier signal, (b) $-x_2^*+\theta x_3$ for transmission from said first antenna and $x_1^*+\theta x_4$ for transmission from said second antenna at a second sample time using said predetermined subcarrier, and (c) $-x_4^*$ for transmission from said first antenna and $x_3^*$ for transmission from said second antenna at a third sample time using said predetermined subcarrier, where $x^*$ is the complex conjugate of x and $\theta$ is a parameter that depends on said predetermined modulation constellation.
21. The communication device of claim 20, wherein:
said predetermined modulation constellation is a quadrature phase shift keying (QPSK) constellation and $\theta=e^{j\pi/4}$.

22. The communication device of claim 20, wherein:
said second sample time occurs after said first sample time and said third sample time occurs after said second sample time.
23. The communication device of claim 20, wherein:
said multicarrier signal is an orthogonal frequency division multiplexing (OFDM) symbol.
24. The communication device of claim 20, wherein:
said communication device is configured to achieve full diversity.
25. A communication device comprising:
first and second dipole antennas;
a constellation mapper to map an input bit stream into complex symbols $x_1$, $x_2$, $x_3$, and $x_4$ based on a predetermined modulation constellation; and
a space-time-frequency mapper to encode and map said complex symbols for transmission from said first and second dipole antennas, wherein said space-time-frequency mapper maps: (a) $x_1+\theta x_3$ for transmission from said first dipole antenna and $x_2+\theta x_4$ for transmission from said second dipole antenna at a first sample time using a predetermined subcarrier of a multicarrier signal and (b) $-x_2^*-\theta x_4^*$ for transmission from said first dipole antenna and $x_1^*+\theta x_3^*$ for transmission from said second dipole antenna at a second sample time using said predetermined subcarrier, where $x^*$ is the complex conjugate of x and $\theta$ is a parameter that depends on said predetermined modulation constellation.
26. The communication device of claim 25, wherein:
said predetermined modulation constellation is a binary phase shift keying (BPSK) constellation and $\theta=j$.
27. The communication device of claim 25, wherein:
said second sample time occurs before said first sample time.
28. The communication device of claim 25, wherein:
said multicarrier signal includes an orthogonal frequency division multiplexing (OFDM) symbol.
29. An article comprising a non-transitory computer readable storage medium having instructions stored thereon that, when executed by a computing platform, operate to:
map an input bit stream into complex symbols $x_1$, $x_2$, $x_3$, and $x_4$ based on a predetermined modulation constellation, said complex symbols $x_1$, $x_2$, $x_3$, and $x_4$ for transmission to a remote receiver;
first transmit $x_1+\theta x_3$ from a first antenna and $x_2+\theta x_4$ from a second antenna at a first sample time; and
second transmit $-x_2^*-\theta x_4^*$ from said first antenna and $x_1+\theta x_3^*$ from said second antenna at a second sample time, wherein no transmissions other than said first transmit operation and said second transmit operation are made to transmit said complex input symbols $x_1$, $x_2$, $x_3$, and $x_4$ to said remote receiver;
wherein $x^*$ is the complex conjugate of x and $\theta$ is a parameter that depends on said predetermined modulation constellation.
30. The article of claim 29, wherein:
said modulation constellation is a binary phase shift keying (BPSK) constellation and $\theta=j$.
31. The article of claim 29, wherein:
said article is for use in a multicarrier system and $x_1+\theta x_3$, $x_2+\theta x_4$, $-x_2^*-\theta x_4^*$, and $x_1^*+\theta x_3^*$ are transmitted using a common subcarrier.

32. The article of claim 31, wherein:

said multicarrier system is an orthogonal frequency division multiplexing (OFDM) system.

33. An article comprising a non-transitory computer readable storage medium having instructions stored thereon that, when executed by a computing platform, operate to:

map an input bit stream into complex symbols $x_1$, $x_2$, $x_3$, and $x_4$ based on a predetermined modulation constellation, said complex symbols $x_1$, $x_2$, $x_3$, and $x_4$ for transmission to a remote receiver;

transmit $x_1$ from a first antenna and $x_2$ from a second antenna at a first sample time;

transmit $-x_2^*+\theta x_3$ from said first antenna and $x_1^*+\theta x_4$ from said second antenna at a second sample time; and transmit $-x_4^*$ from said first antenna and $x_3^*$ from said second antenna at a third sample time;

wherein $x^*$ is the complex conjugate of x and $\theta$ is a parameter that depends on said predetermined modulation constellation.

34. The article of claim 33, wherein:

said modulation constellation is a binary phase shift keying (BPSK) constellation and $\theta=j$.

35. The article of claim 33, wherein:

said modulation constellation is a quadrature phase shift keying (QPSK) constellation and $\theta=e^{j\pi/4}$.

36. The article of claim 33, wherein:

said article is for use in a multicarrier system and $x_1$, $x_2$, $-x_2^*+\theta x_3$, $x_1^*+\theta x_4$, $-x_4^*$, and $x_3^*$ are transmitted using a common subcarrier.

37. The article of claim 33, wherein:

said multicarrier system is an orthogonal frequency division multiplexing (OFDM) system.

\* \* \* \* \*

UNITED STATES PATENT AND TRADEMARK OFFICE
CERTIFICATE OF CORRECTION

PATENT NO. : 8,040,968 B2
APPLICATION NO. : 10/954952
DATED : October 18, 2011
INVENTOR(S) : Sumeet Sandhu Page 1 of 1

It is certified that error appears in the above-identified patent and that said Letters Patent is hereby corrected as shown below:

In column 10, line 49, in claim 29, delete "$x_1+\theta x_3^*$" and insert -- $x_1^*+\theta x_3^*$ --, therefor.

Signed and Sealed this
Seventeenth Day of January, 2012

David J. Kappos
*Director of the United States Patent and Trademark Office*